(12) United States Patent
Hangjie

(10) Patent No.: US 11,358,283 B2
(45) Date of Patent: Jun. 14, 2022

(54) ROBOT CALIBRATION METHOD AND ROBOT CALIBRATION DEVICE

(71) Applicant: FANUC CORPORATION, Yamanashi (JP)

(72) Inventor: Jiang Hangjie, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 260 days.

(21) Appl. No.: 16/783,421

(22) Filed: Feb. 6, 2020

(65) Prior Publication Data

US 2020/0254620 A1 Aug. 13, 2020

(30) Foreign Application Priority Data

Feb. 8, 2019 (JP) .............................. JP2019-021650

(51) Int. Cl.
*B25J 9/16* (2006.01)
*B25J 19/00* (2006.01)

(52) U.S. Cl.
CPC ......... *B25J 9/1692* (2013.01); *B25J 19/0066* (2013.01)

(58) Field of Classification Search
CPC .... B25J 9/1692; B25J 19/0066; B25J 9/1005; G05B 2219/39056; G05B 2219/39027; G05B 2219/39048
See application file for complete search history.

(56) References Cited

U.S. PATENT DOCUMENTS

| | | | |
|---|---|---|---|
| 2002/0038855 A1* | 4/2002 | Hwang | B25J 9/1692 250/559.29 |
| 2006/0023938 A1* | 2/2006 | Ban | B25J 9/1692 382/153 |
| 2008/0188986 A1* | 8/2008 | Hoppe | B25J 9/1692 901/41 |
| 2018/0021955 A1* | 1/2018 | Hatanaka | B25J 9/1692 700/254 |
| 2018/0169854 A1* | 6/2018 | Shiratsuchi | B25J 9/042 |
| 2020/0130192 A1* | 4/2020 | Ogawa | B25J 13/085 |

FOREIGN PATENT DOCUMENTS

| | | |
|---|---|---|
| JP | H0446714 B2 | 7/1992 |
| JP | H6790 A | 1/1994 |
| JP | H6134683 A | 5/1994 |
| JP | 4819957 B1 | 11/2011 |

* cited by examiner

*Primary Examiner* — Robert T Nguyen
(74) *Attorney, Agent, or Firm* — Hauptman Ham, LLP

(57) ABSTRACT

Provided is a robot calibration method for calibrating a position of an arm tip of a robot, the method including measuring a relative positional relationship between a first link and a second link on opposite ends of at least three links which are connected to each other so as to execute collective calibration for at least two joint axes between the at least three links, measuring a relative positional relationship between a base and a link connected to the base to execute independent calibration for a joint axis between the base and the link, or measuring a relative positional relationship between the first link and another link as to execute independent calibration for a joint axis between the first link and the other link, and calibrating the position of the arm tip based on the collective and the independent calibrations.

7 Claims, 18 Drawing Sheets

ROBOT CALIBRATION METHOD AND ROBOT CALIBRATION DEVICE

RELATED APPLICATIONS

The present application claims priority of Japanese Application Number 2019-021650 filed on Feb. 8, 2019, the disclosure of which is hereby incorporated by reference herein in its entirety.

BACKGROUND OF THE INVENTION

1. Field of the Invention

The present invention relates to a robot calibration method and a robot calibration device.

2. Description of the Related Art

In robots including an arm formed of a plurality of links and joint axes, the calibration of each of the joint axes is performed at the time of shipment or the like. Japanese Examined Patent Publication (Kokoku)/No. JP 04-046714B describes a structure in which all of the joint axes of a robot are calibrated collectively by attaching a jig to a wrist tip part of the robot and detecting the posture of the jig using a support having a dial gauge installed on a fixed base thereof. Japanese Patent No. JP 4819957B describes a structure in which single-axis calibration is executed by a method in which visual marks are captured with a camera.

SUMMARY OF THE INVENTION

Depending on the configuration of a robot, it may be difficult to perform collective calibration of all of the joint axes thereof in the manner described in JP 04-046714B in some cases. In such a case, the joint axes are generally calibrated axis-by-axis using a single-axis jig. However, axis-by-axis calibration has a disadvantage in an increase in the number of jigs and the number of calibration steps. It is desired to efficiently perform joint axis calibration even when the robot has a structure in which it is difficult to collectively calibrate all of the joint axes.

An aspect of the present disclosure provides a robot calibration method in which a position of an arm tip of an articulated robot including an arm having a plurality of links and a plurality of joint axes and a base which supports the arm via another joint axis is calibrated, the method including: measuring a relative positional relationship between a first link and a second link on opposite ends of at least three links which are separated from the base and which are connected to each other so as to execute collective calibration for at least two joint axes between the at least three links; measuring a relative positional relationship between the base and a link connected to the base to execute independent calibration for a joint axis between the base and the link, or measuring a relative positional relationship between the first link and another link connected to the at least three links so as to execute independent calibration for a joint axis between the first link and the other link; and calibrating the position of the arm tip based on the collective calibration and the independent calibration.

Another aspect of the present disclosure provides a robot calibration device which calibrates a position of an arm tip of an articulated robot including an arm having a plurality of links and a plurality of joint axes and a base which supports the arm via another joint axis, the device including: a first reference surface and a second reference surface which are provided on a first link and a second link, respectively, on opposite ends of at least three links which are separated from the base and which are connected to each other; a gauge which contact-measures relative positions and relative postures between the first reference surface and the second reference surface; a measuring instrument which measures a relative positional relationship between the base and a link connected to the base, or a measuring instrument which measures a relative positional relationship between the first link and another link connected to the at least three links; and a processor which calibrates the position of the arm tip based on measurement results of the gauge and measurement results of the measuring instrument.

BRIEF DESCRIPTION OF DRAWINGS

The object, characteristics, and advantages of the present invention will be elucidated by the description of the embodiments below, referring to the attached drawings. In the attached drawings.

DETAILED DESCRIPTION

Figure 1:
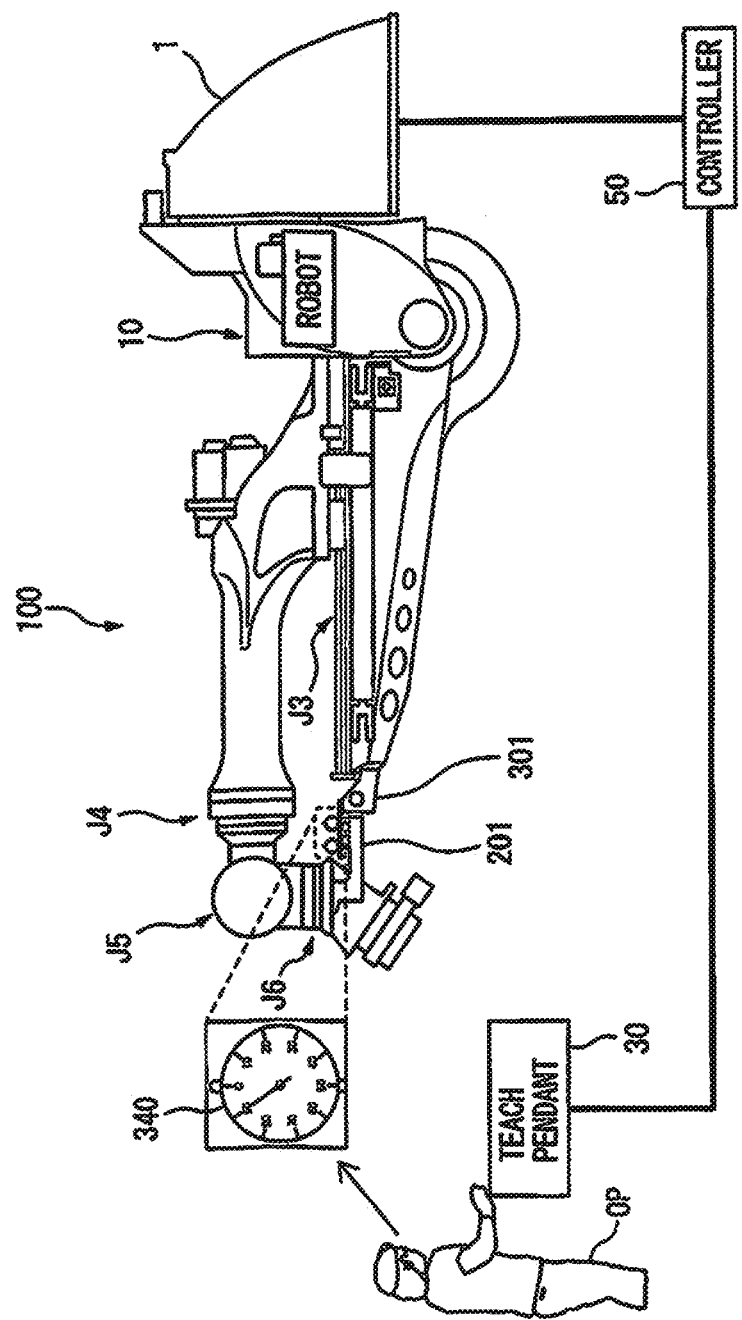
FIG. 1 is a view showing the overall structure of a robot calibration device according to an embodiment.

The embodiments of the present disclosure will be described with reference to the attached drawings. In the drawings, corresponding constituent elements are assigned common reference signs. In order to facilitate understanding, the scales of the drawings have been appropriately modified. Furthermore, the forms illustrated in the drawings are merely examples for carrying out the present invention. The present invention is not limited to the illustrated forms.

Figure 2:
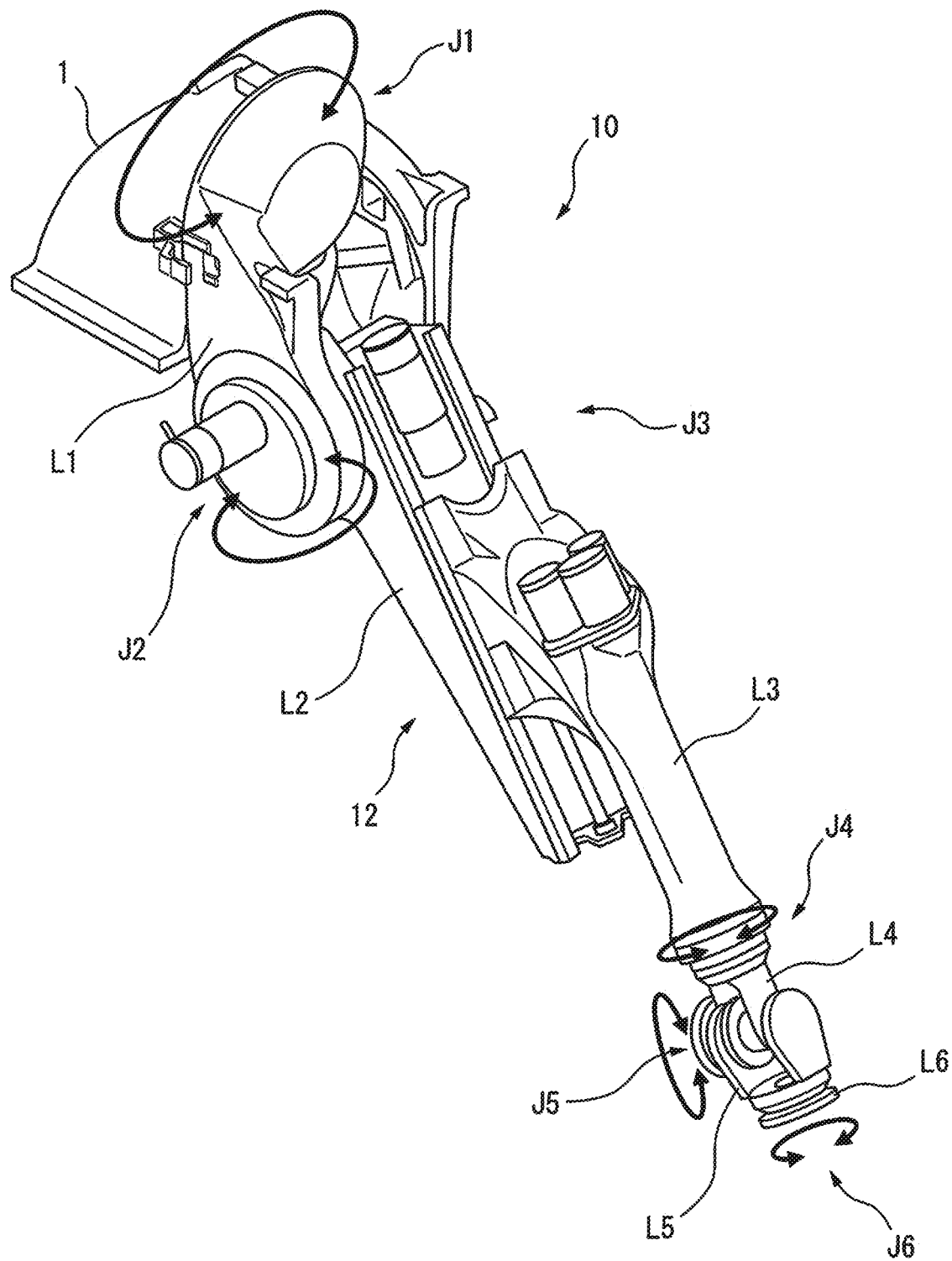
FIG. 2 is a perspective view of the robot.

FIG. 1 is a view showing the overall configuration of a robot calibration device 100 according to an embodiment. As shown in FIG. 1, the robot calibration device 100 includes a robot 10, a controller 50 which controls the robot 10, and a teach pendant 30 connected to the controller 50. FIG. 1 is a side view of the robot 10. FIG. 2 is a perspective view of the robot 10. The robot 10 is an articulated robot including an arm 12 having a plurality of links L1 to L6 and a plurality of joint axes (J2 to J6), and a base 1 which supports the arm 12 via another joint axis (J1). The controller 50 controls the robot 10 by performing position control of each of the joint axes of the robot 10. The controller 50 may have the structure of a conventional computer including a CPU, ROM, RAM, operation parts, etc.

Figure 27:
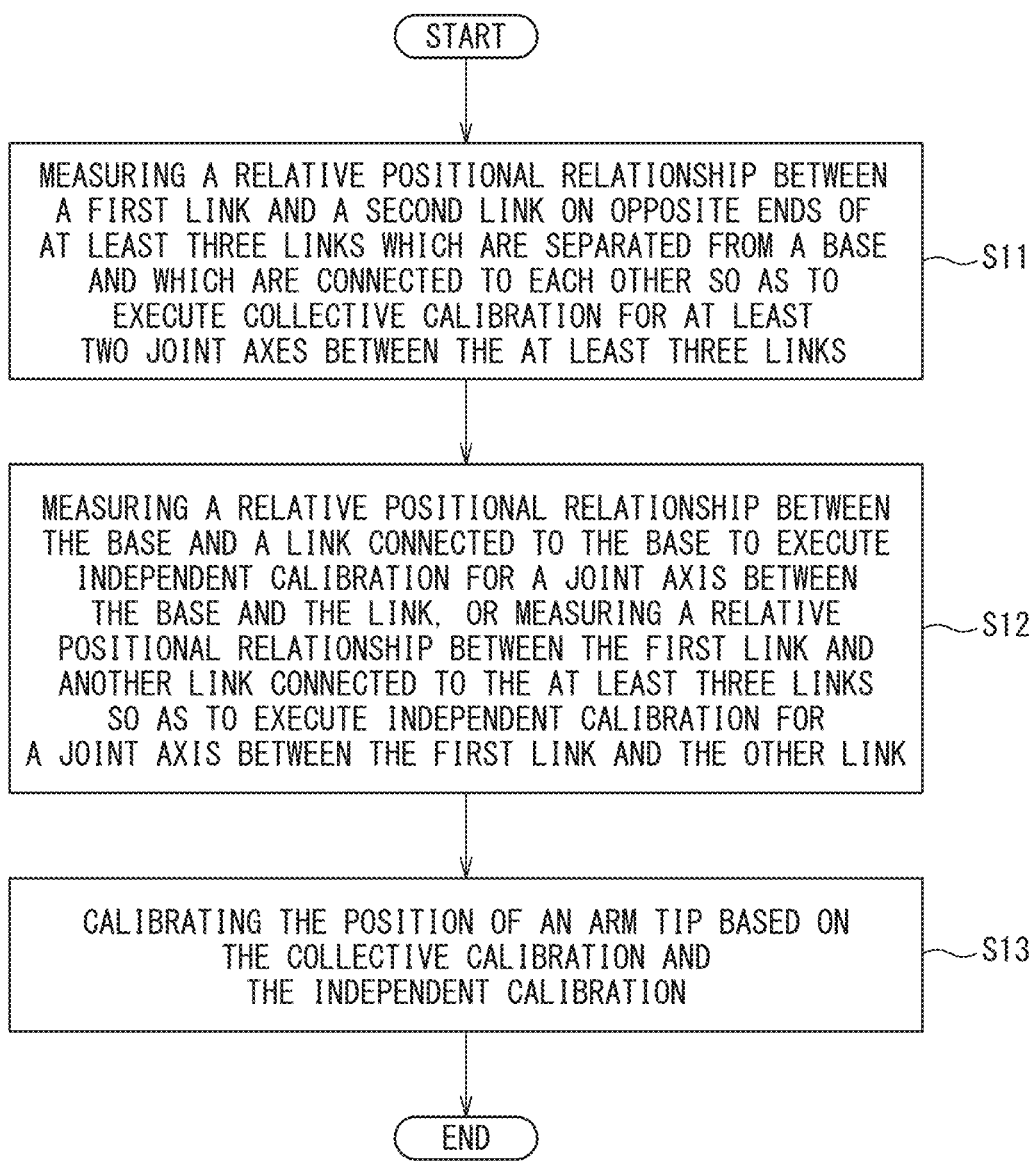
FIG. 27 is a flowchart showing a calibration procedure according to the present embodiment.

As shown in FIGS. 1 and 2, the robot 10 includes a linear motion axis as the third joint axis J3. In the case of an articulated robot including a linear motion axis, as in the robot 10, when collective calibration for all six axes is attempted by mounting respective calibration members on the tip link L6 (wrist) and the base 1 of the robot 10 and positioning the link L6 (wrist) relative to the base 1, since the distance between the link L6 (wrist) and the base 1 is large, there is a disadvantage in that the calibration members become excessively large. The robot calibration device 100 makes the calibration more efficient by performing calibration as described below. In the robot calibration device 100, the relative positional relationship between a first link (e.g., link L2) and a second link (e.g., link L6) on opposite ends of at least three links (e.g., L2 to L6) which are separated from the base 1 and which are connected to each other is measured so as to execute collective calibration for at least two joint axes (e.g., J3 to J6) between the at least three links (step S11 in FIG. 27). Next, by measuring the relative positional relationship between the base 1 and a link (e.g., link L1) connected to the base 1, independent calibration for the joint axis between the base and the link is performed, or by measuring the relative positional relationship between the first link (e.g., link L2) and another link (e.g., link L1) connected to the at least three links described above, independent calibration for the joint axis (e.g., J2) between the first link and the other link is performed (step S12 in FIG. 27). The position of the arm tip is then calibrated based on the collective calibration and the independent calibration (step S13 in FIG. 27).

In the present embodiment, the relative positions and relative postures between a first reference surface R1 (refer to FIG. 6B) formed on the link L2 corresponding to the first link described above and a second reference surface R2 (refer to FIG. 7B) formed on the link L6 corresponding to the second link described above are contact-measured using dial gauges, and collective calibration of the joint axes J3 to J6 between the link L2 and the link L6 is executed based on the measurement results.

Figure 3:
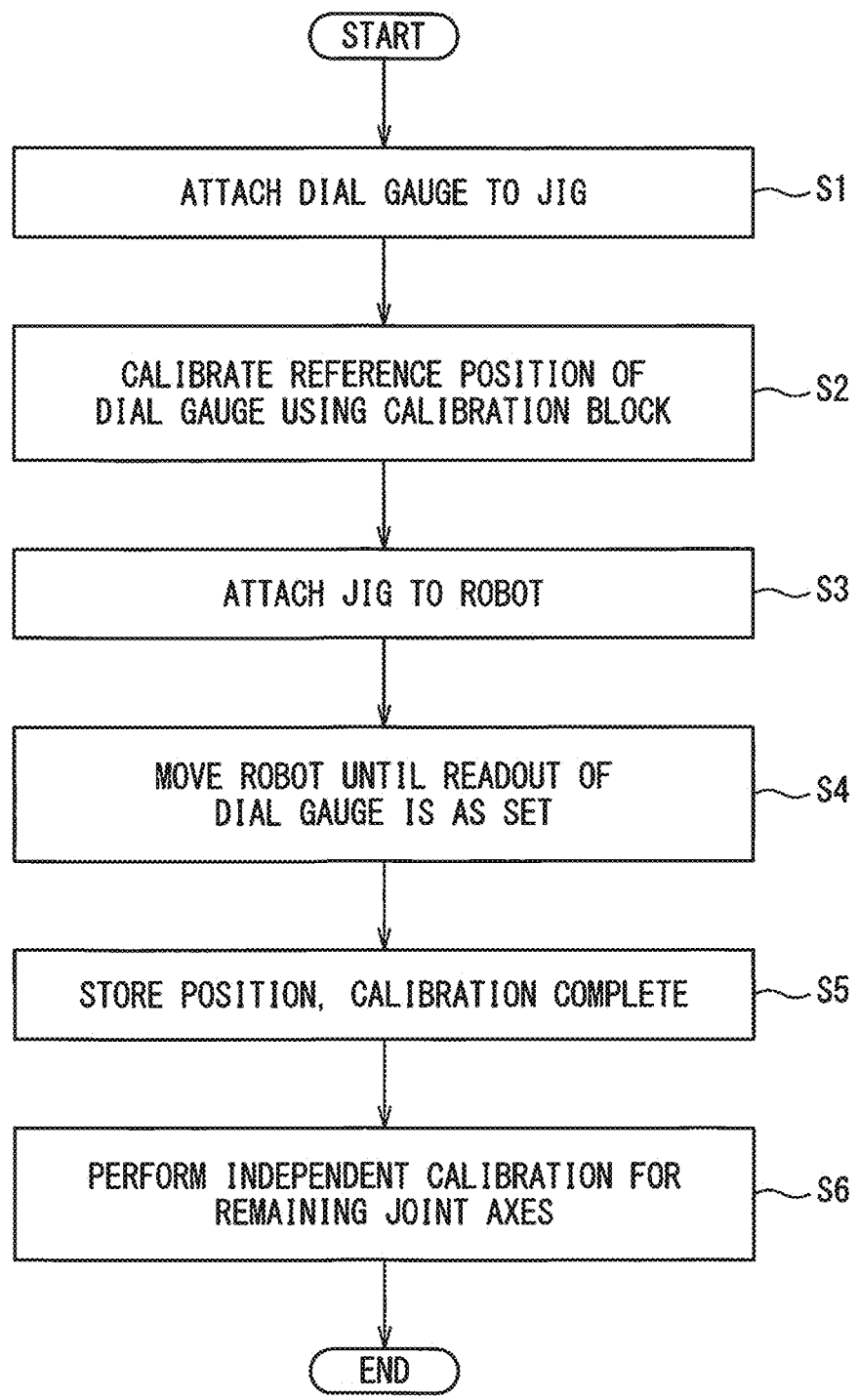
FIG. 3 is a flowchart showing a calibration procedure according to the present embodiment.
Figure 11:
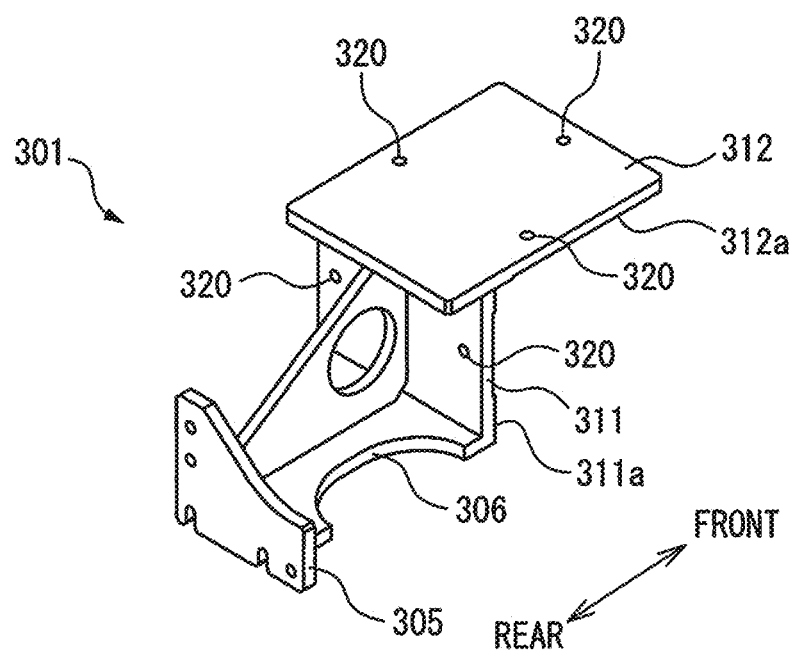
FIG. 11 is a perspective view of the first member as viewed from the rear side.
Figure 12:
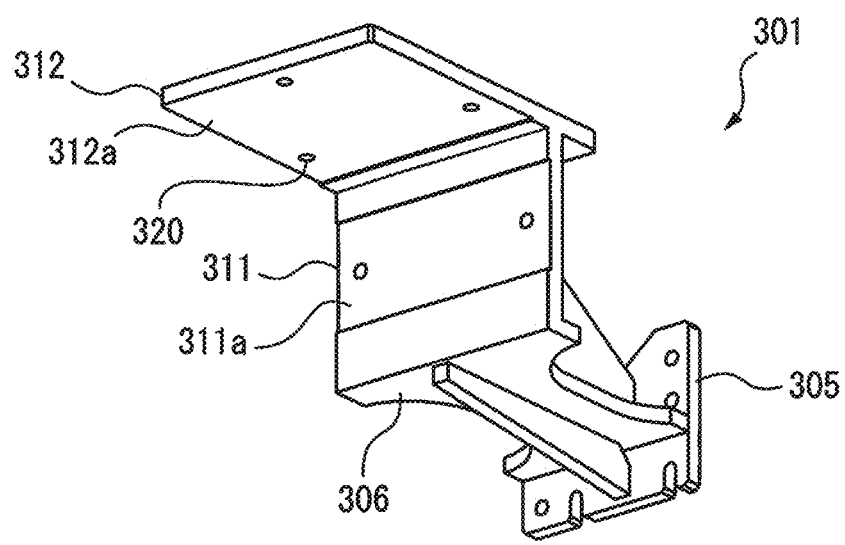
FIG. 12 is a perspective view of the first member as viewed from below in FIG. 11.

FIG. 3 is a flowchart showing the calibration procedure according to the present embodiment. The calibration procedure will be described with reference to FIG. 3. First, dial gauges 340 are mounted on a first member 301, which is a calibration member (jig) for dial gauge mounting (step S1). FIGS. 11 and 12 are perspective views of the first member 301 as viewed from the rear upper side and a perspective view as viewed from the front lower side, respectively. It should be noted that for convenience of explanation, in the description regarding the first member 301 alone, the side on which the mounting wall 305 is present, as shown in FIG. 11, will be referred to as the rear side. The first member 301 includes a mounting wall 305 which is attached to the first reference surface R1 formed on the link L2 (arm member) of the robot 10, a plate-like bottom wall 306 which extends frontward from the mounting wall 305, a first gauge mounting wall 311 which extends upward from the tip of the bottom wall 306, and a second gauge mounting wall 312 which is connected to the upper end of the first gauge mounting wall 311 and which is formed so as to extend perpendicularly frontward with respect to the first gauge mounting wall 311. Two dial gauge insertion holes 320 for insertion of dial gauges 340 are provided in the first gauge mounting wall 311 near the ends thereof in the horizontal direction. A total of three dial gauge insertion holes 320 are provided in the second gauge mounting wall 312, two near the left and right ends in the front and rear direction central part, and one in the front end in the left and right direction central part. The front side surface of the first gauge mounting wall 311 and the bottom surface of the second gauge mounting wall 312 constitute the mutually orthogonal first gauge attachment surface 311a and second gauge attachment surface 312a, respectively.

Figure 4:
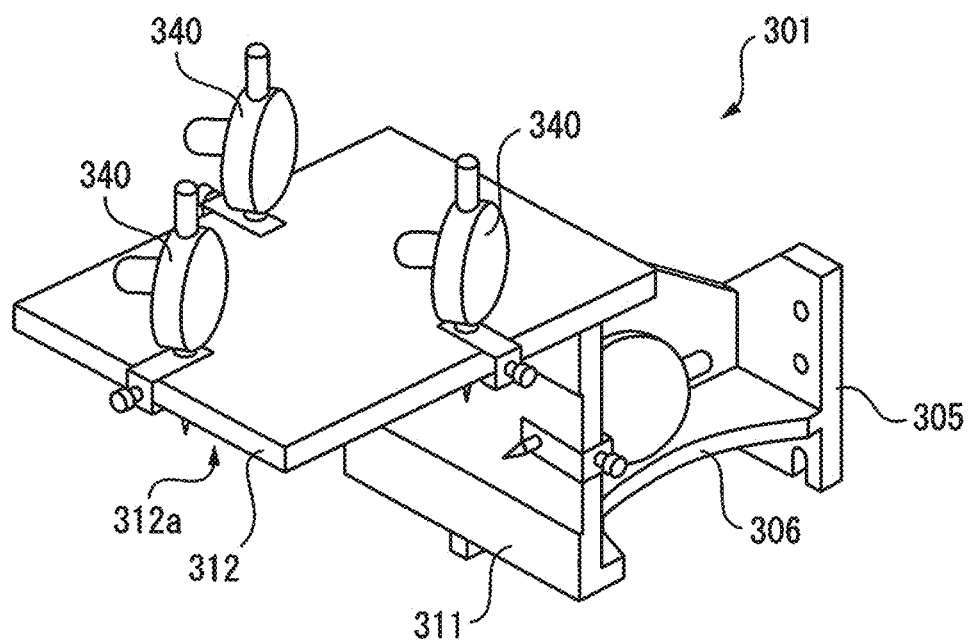
FIG. 4 is a perspective view showing a state in which dial gauges are mounted on a first member.
Figure 5:
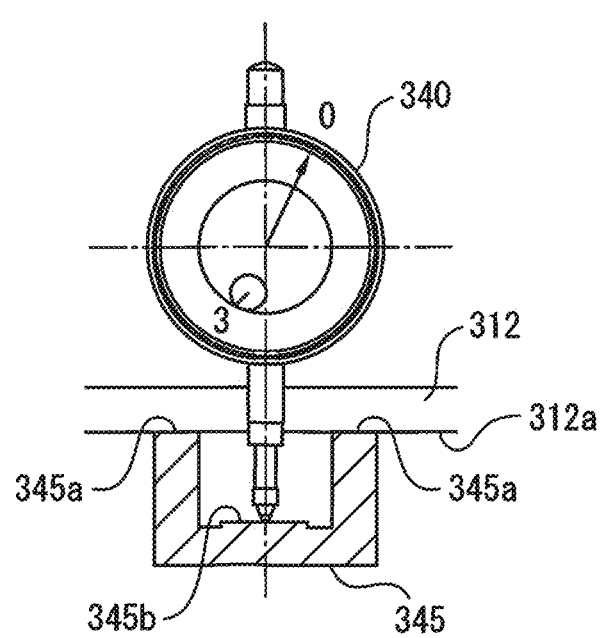
FIG. 5 is a view showing dial gauge calibration using a calibration block.

In step S1, five dial gauges 340 are mounted in the total of five of the dial gauge insertion holes 320 of the first member 301. FIG. 4 is a perspective view illustrating a state in which the dial gauges 340 are mounted on the first member 301. Next, in step S2, the reference position of the dial gauge 340 is calibrated using a calibration block 345. FIG. 5 is a view showing how the dial gauge 340 is calibrated using the calibration block 345. The calibration block 345 has a predetermined reference dimension between the two end surfaces 345a and the bottom surface 345b. For example, the end surfaces 345a of the calibration block 345 are pressed against the second gauge attachment surface 312a so that the probe of the dial gauge 340 abuts against the bottom surface 345b. The dial gauge 340 is calibrated so that the readout of the dial gauge 340 at this time matches the reference dimension of the calibration block 345.

Figure 6A:
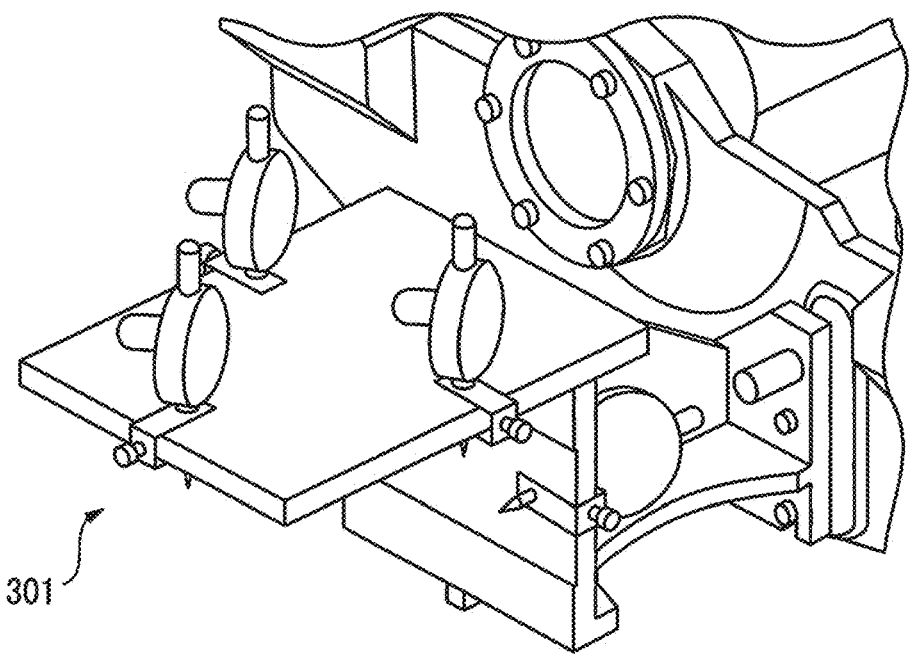
FIG. 6A illustrates a state in which a first member is fixed to a first reference surface of a second link.
Figure 6B:
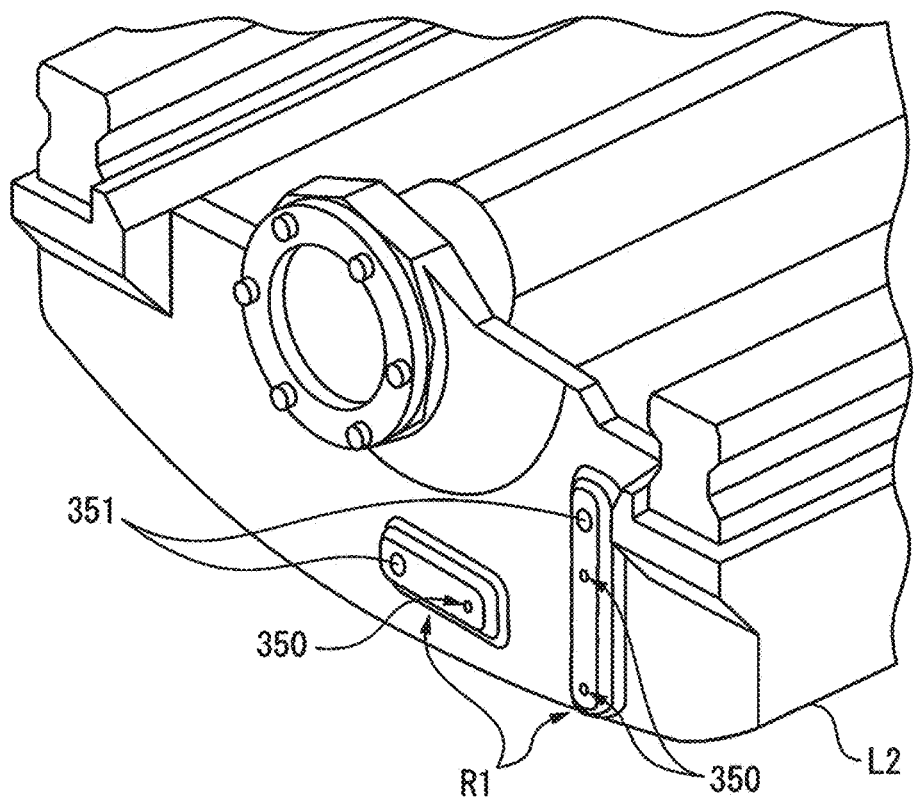
FIG. 6B is a view showing the first reference surface of the second link.

Next, in step S3, the first member 301 and a second member 201 are attached to the robot 10. As shown in FIG. 6B, member mounting threaded holes 350 and positioning pin holes 351 are formed in the portion of the link L2 (arm member) on which the first reference surface R1 is formed. In a state in which the mounting wall 305 of the first member 301 is closely contacted to the first reference surface R1, the mounting wall 305 is secured with screws after having been accurately positioned on the first reference surface R1 using the threaded holes 350 and the positioning pin holes 351. FIG. 6A shows a state in which the first member 301 is fixed to the first reference surface R1.

Figure 9:
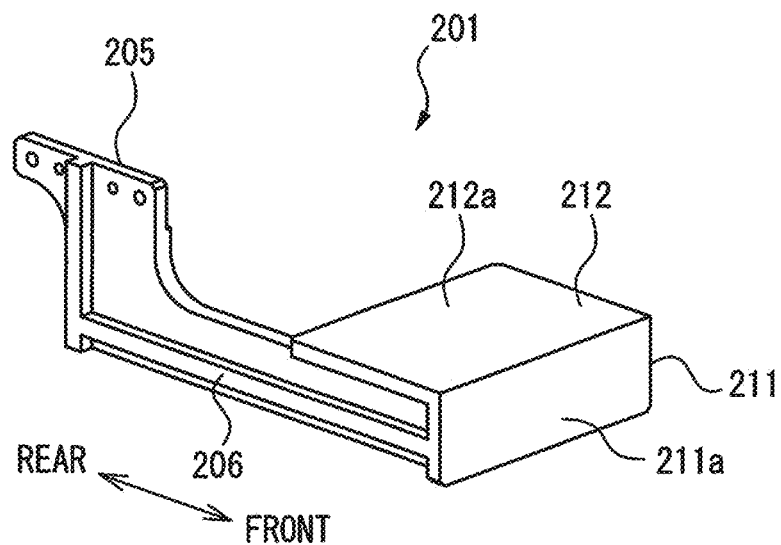
FIG. 9 is a perspective view of the second member.
Figure 10:
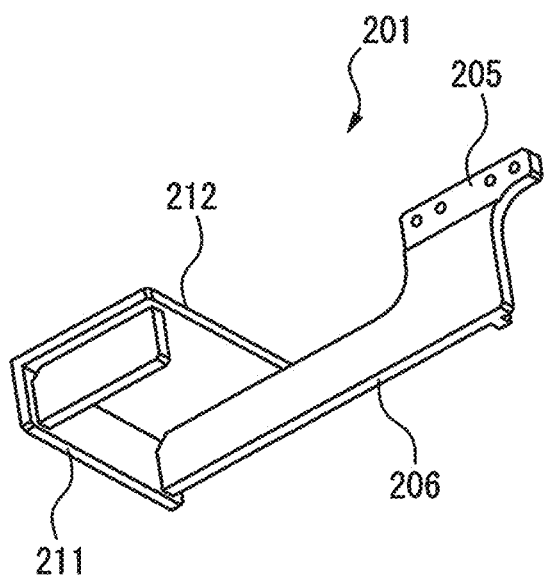
FIG. 10 is a perspective view of the second member as viewed from below in FIG. 9.

Next, the second member 201 which is attached to the link L6 (wrist) will be described. FIGS. 9 and 10 are a perspective view as viewed obliquely from above and a perspective view as viewed obliquely from below of the second member 201, respectively. It should be noted that for convenience of explanation, in the description of the second member 201 alone, the side on which the mounting wall 205 is present, as shown in FIG. 9, will be referred to as the rear side. As shown in FIGS. 9 and 10, the second member 201 includes a mounting wall 205 which is attached to the second reference surface R2, a support wall 206 which extends frontward from the mounting wall 205, and mutually orthogonal first and second measurement walls 211 and 212 which are provided on the tip of the support wall 206. The front side surface of the first gauge measurement wall 211 and the upper surface of the second measurement wall 212 constitute the mutually orthogonal first gauge measurement surface 211a and second gauge measurement surface 212a, respectively.

Figure 7A:
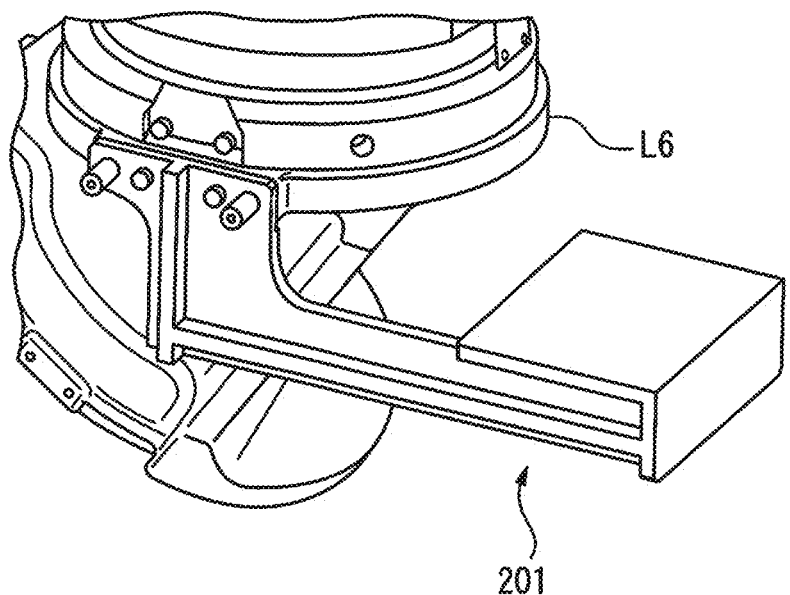
FIG. 7A illustrates a state in which a second member is fixed to a second reference surface of a sixth link (wrist)
Figure 7B:
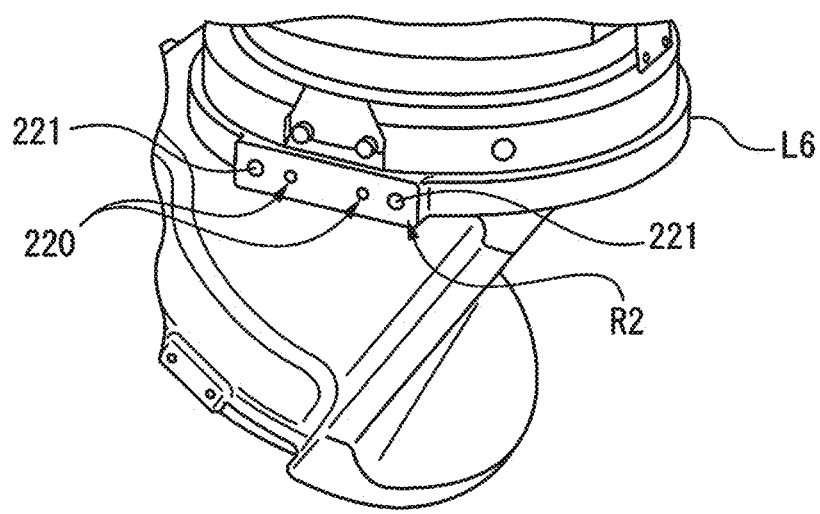
FIG. 7B is a view showing the second reference surface of the sixth link (wrist)

As shown in FIG. 7B, member mounting threaded holes 220 and positioning pin holes 221 are formed in the portion of the link L6 (wrist) on which the second reference surface R2 is formed. In a state in which the mounting wall 205 of the second member 201 is closely contacted to the second reference surface R2, the mounting wall 205 is secured with screws after having been accurately positioned on the second reference surface R2 using the threaded holes 220 and the positioning pin holes 221. FIG. 7A shows a state in which the second member 201 is fixed to the second reference surface R2.

Figure 8:
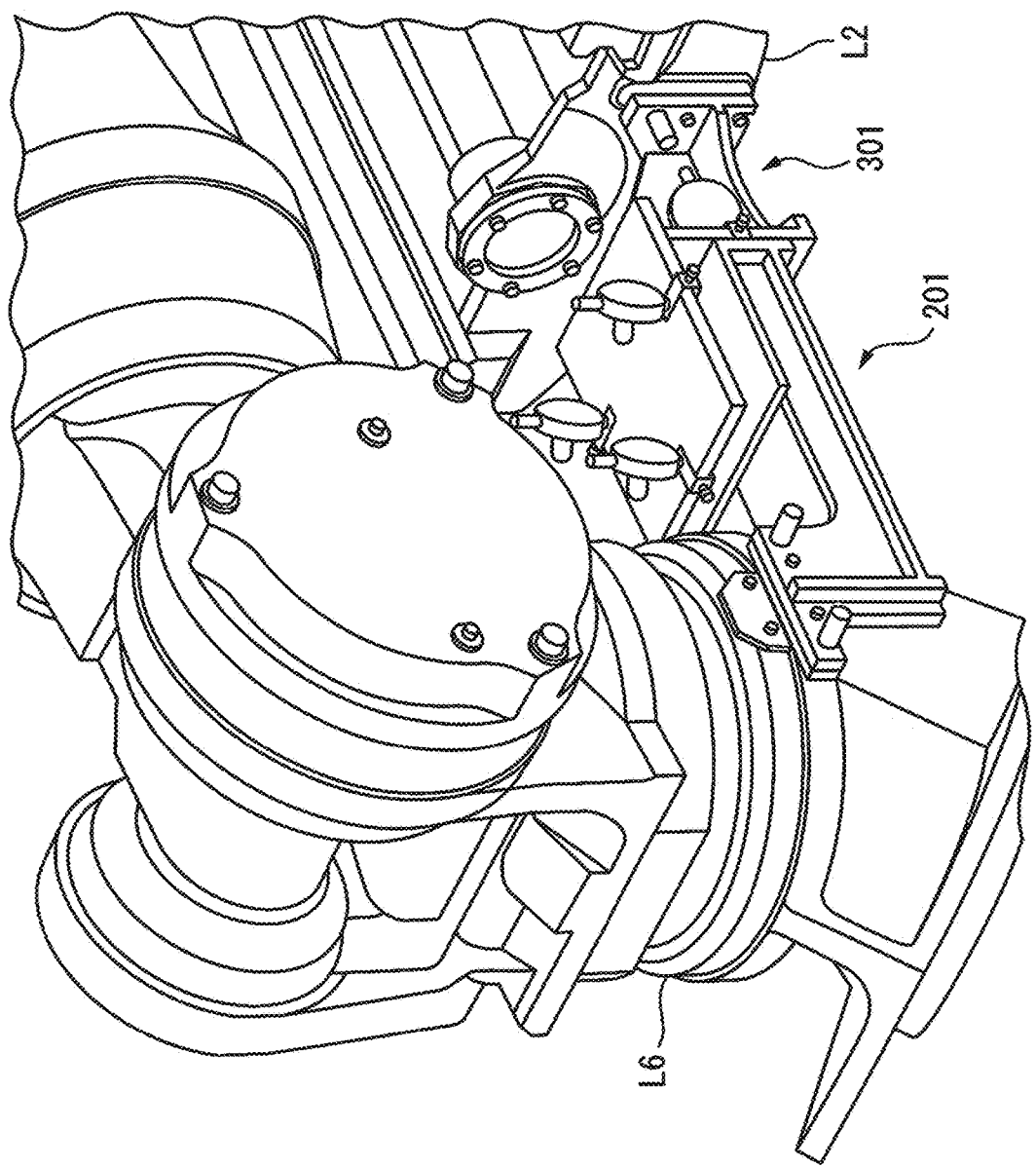
FIG. 8 illustrates a state in which the second member has been positioned relative to the first member so that the readout of the dial gauge falls within a predetermined range.

Next, in step S4, an operator OP operates the teach pendant 30 to move the robot 10, and brings the second member 201 close to the first member 301. The operator OP then brings the first gauge measurement surface 211a into contact with the two dial gauges 340 attached to the first gauge attachment surface 311a and brings the second gauge measurement surface 212a into contact with the three dial gauges 340 attached to the second gauge attachment surface 312a. The operator OP then further performs movement operations of the robot 10 until the readouts of the dial gauges 340 are within the predetermined range. When the readouts of all of the dial gauges 340 are within the predetermined range, it is confirmed that the first gauge measurement surface 211a and the first gauge attachment surface 311a, as well as the second gauge measurement surface 212a and the second gauge attachment surface 312a, have assumed predetermined positional and postural relationships. FIG. 8 shows a state in which the second member 201 has been positioned with respect to the first member 301 until the readouts of the dial gauges 340 fall within the predetermined range. The controller 50 stores the positions of the joint axes J3 to J6 at this time. The controller 50 can perform collective calibration of the origin positions of the joint axes J3 to J6 using these stored values (step S5).

The first member 301 serving as the calibration member according to the present embodiment has a two-surface structure including the first gauge attachment surface 311a and the second gauge attachment surface 312a, which are a pair of mutually orthogonal gauge attachment surfaces, and the second member 201 has a two-surface structure including the first gauge measurement surface 211a and the second gauge measurement surface 212a, which are a pair of mutually orthogonal gauge measurement surfaces. Using such calibration members having two-surface structures, simultaneous positioning of four joint axes J3 to J6 is achieved. Specifically, by measuring the first gauge measurement surface 211a using the two gauges attached to the first gauge attachment surface 311a, the positions of the linear motion axis J3 and the joint axis J6 can be prescribed, and by measuring the second gauge measurement surface 212a with the three gauges attached to the second gauge attachment surface 312a, the positions of the joint axes J4, J5 can be prescribed.

When collective calibration of the joint axes J3 to J6 is completed as described above, independent calibration is executed individually for the two remaining joint axes J1, J2 (step S6).

Figure 13:
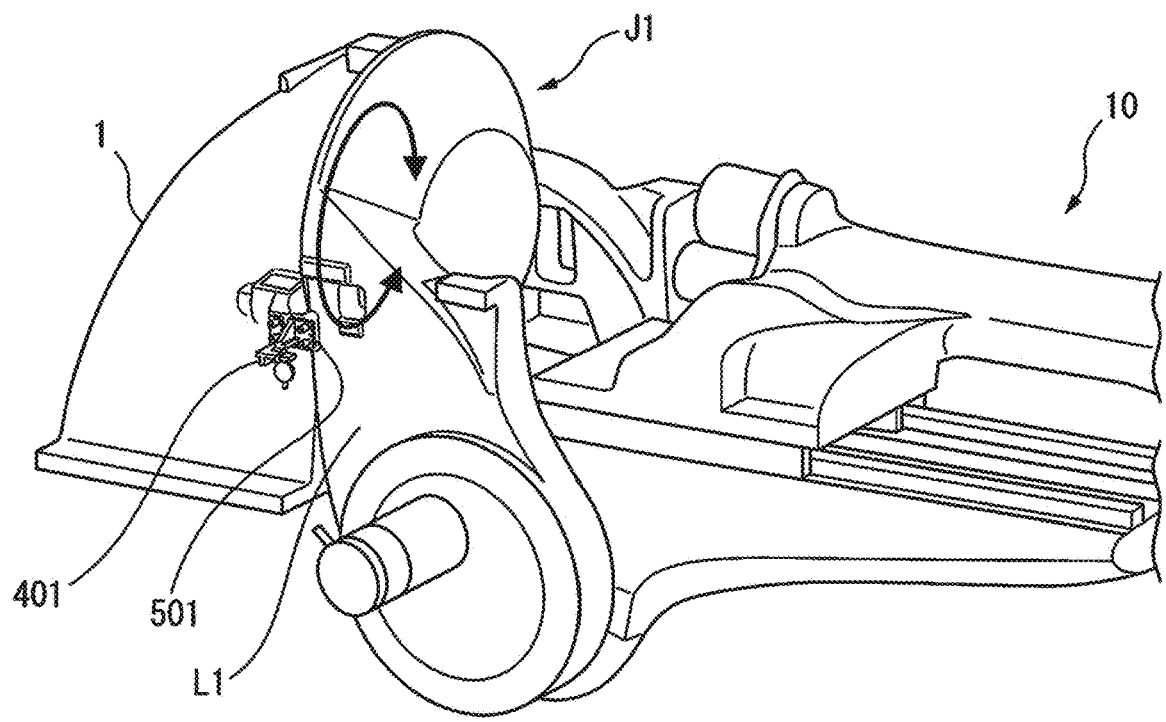
FIG. 13 is a perspective view of the vicinity of a first joint axis of the robot.
Figure 14:
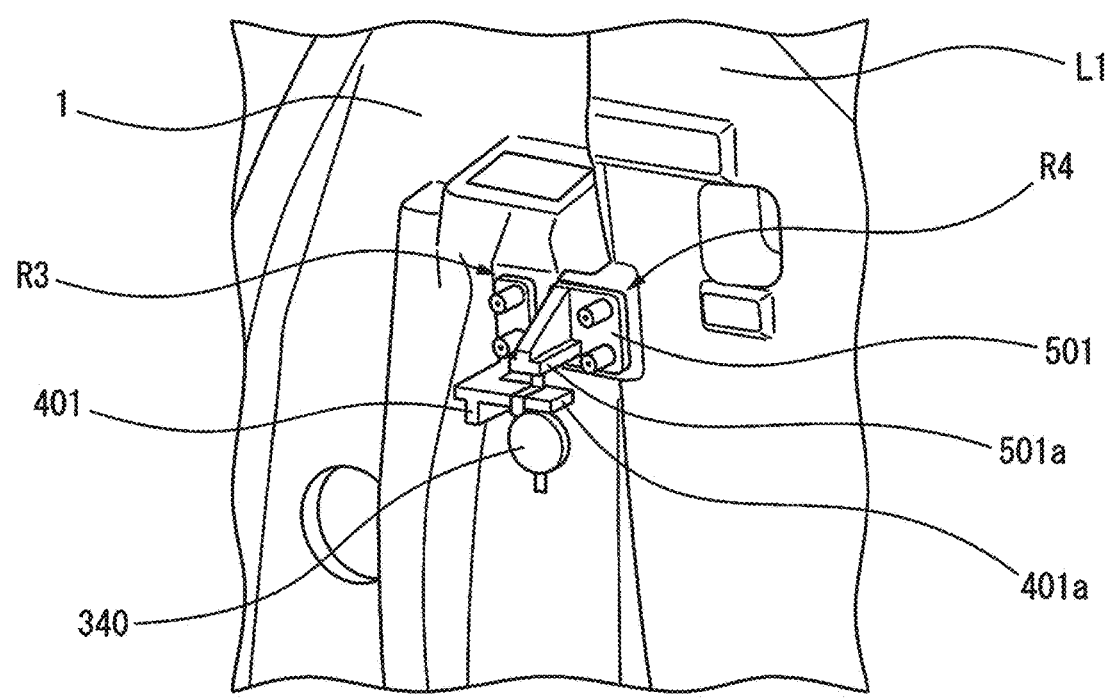
FIG. 14 is an enlarged view of the vicinity of a measurement member in FIG. 13.

Next, independent calibration of joint axis J1 will be described with reference to FIGS. 13 to 18. FIG. 13 is a perspective view of the vicinity of the joint axis J1 of the robot 10. FIG. 14 is an enlarged view of the vicinity of measurement members 401, 501 of FIG. 13. As jigs for measuring the relative positional relationship of the base 1 and the link L1, the measurement member 401 is fixed to a reference surface R3 of the base 1 and the measurement member 501 is attached to a reference surface R4 of the link L1. A dial gauge 340 is attached to the gauge attachment surface 401a of the measurement member 401. The operator OP operates the teach pendant 30 to rotate the link L1 about the joint axis J1, and brings the gauge measurement surface 501a of the measurement member 501 close to the gauge attachment surface 401a of the measurement member 401 until the readout of the dial gauge 340 falls within the predetermined range. As a result, the relative positional relationship of the gauge attachment surface 401a and the gauge measurement surface 501a is measured. When the readout of the dial gauge 340 is within the predetermined range, the position of the joint axis J1 is stored. As a result, calibration of the origin position of the joint axis J1 can be performed.

Figure 15:
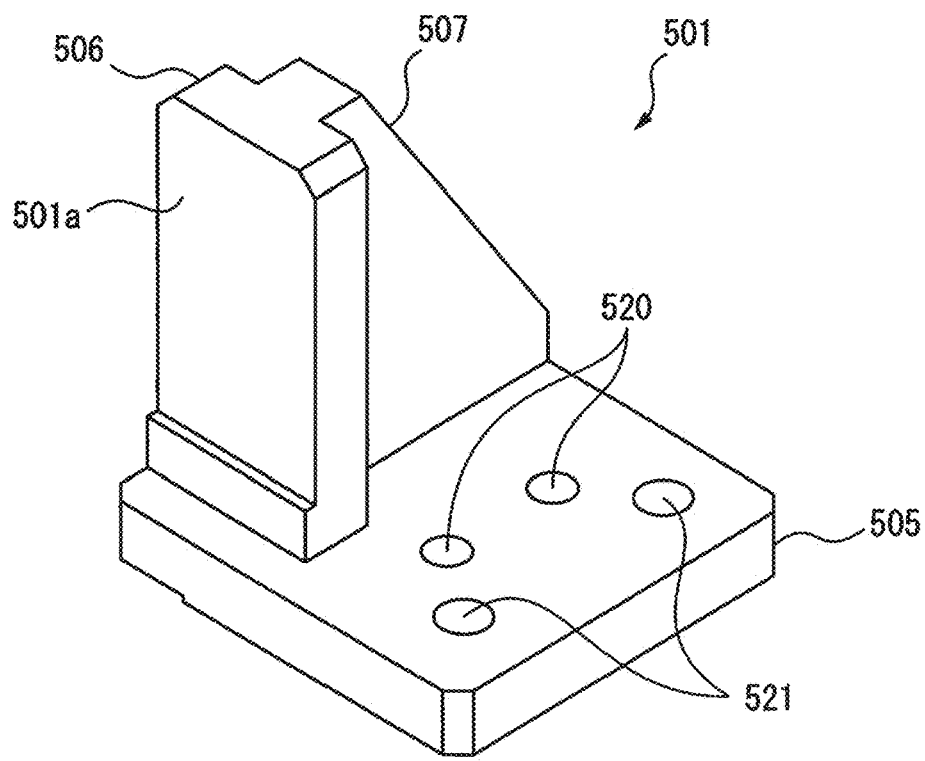
FIG. 15 is a perspective view of the measurement member.
Figure 16:
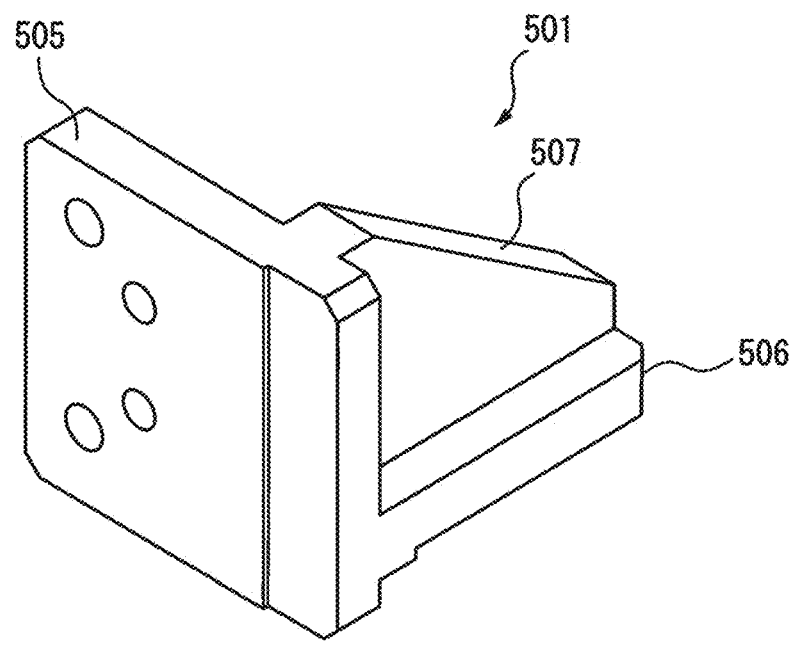
FIG. 16 is a perspective view of the measurement member as viewed from the bottom surface side in FIG. 15.

FIG. 15 is a perspective view of the measurement member 501, and FIG. 16 is a perspective view of the measurement member 501 as viewed from the bottom surface side in FIG. 15. As shown in FIGS. 15 and 16, the measurement member 501 includes a mounting wall 505 which is attached to the reference surface of the link L1, a gauge measurement wall 506 standing on the mounting wall 505, and a support wall 507 which supports the gauge measurement wall 506. Threaded holes 520 and positioning pin holes 521 are formed in the mounting wall 505, and the measurement member 501 is secured with screws after having been accurately positioned on the reference surface R4 of the link L1 via the threaded holes 520 and positioning pin holes 521. The front side surface of the gauge measurement wall 506 in FIG. 15 constitutes the gauge measurement surface 501a.

Figure 17:
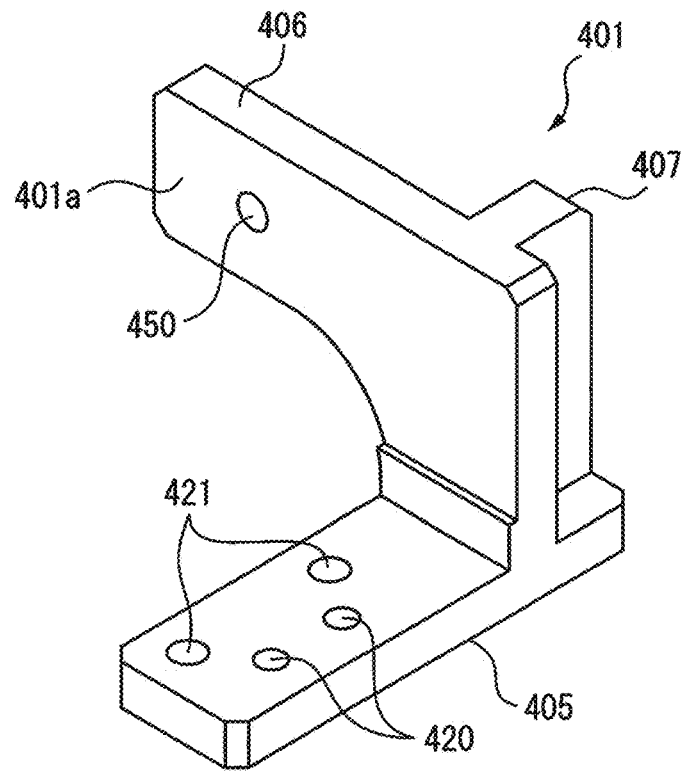
FIG. 17 is a perspective view of a measurement member.
Figure 18:
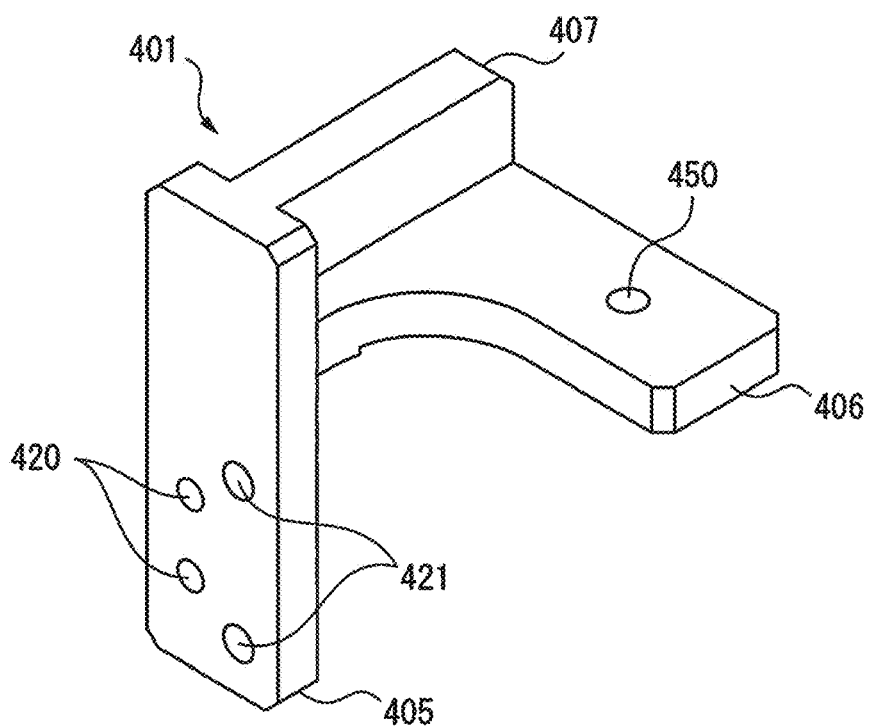
FIG. 18 is a perspective view of the measurement member as viewed from the bottom surface side in FIG. 17.

FIG. 17 is a perspective view of the measurement member 401 and FIG. 18 is a perspective view of the measurement member 401 as viewed from the bottom surface side in FIG. 17. As shown in FIGS. 17 and 18, the measurement member 401 includes a mounting wall 405 which is attached to the reference surface R3 of the base 1, a gauge mounting wall 406 which stands on the mounting wall 405, and a support wall 407 which supports the gauge mounting wall 406. Threaded holes 420 and positioning pin holes 421 are formed in the mounting wall 405, and the measurement member 401 is secured with screws after having been accurately positioned on the reference surface R3 of the base 1 via the threaded holes 420 and the positioning pin holes 421. The surface on the front side of the gauge mounting wall 406 in FIG. 17 constitutes the gauge attachment surface 401a. An attachment hole 450 for attachment of a dial gauge 340 is formed in the gauge mounting wall 406.

Figure 19:
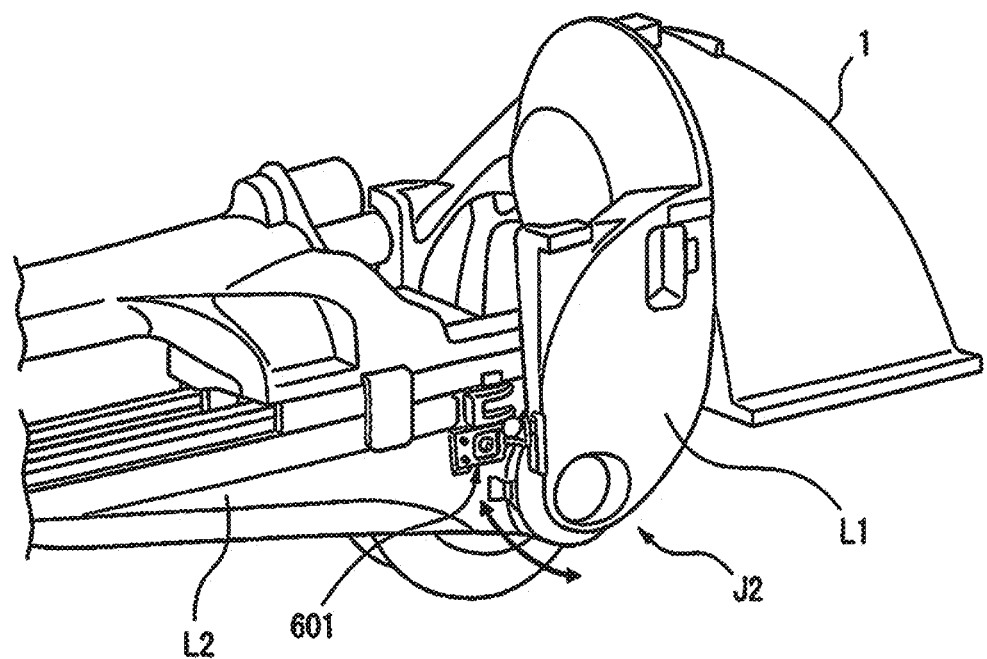
FIG. 19 is a perspective view of the vicinity of a second joint axis of the robot.
Figure 20:
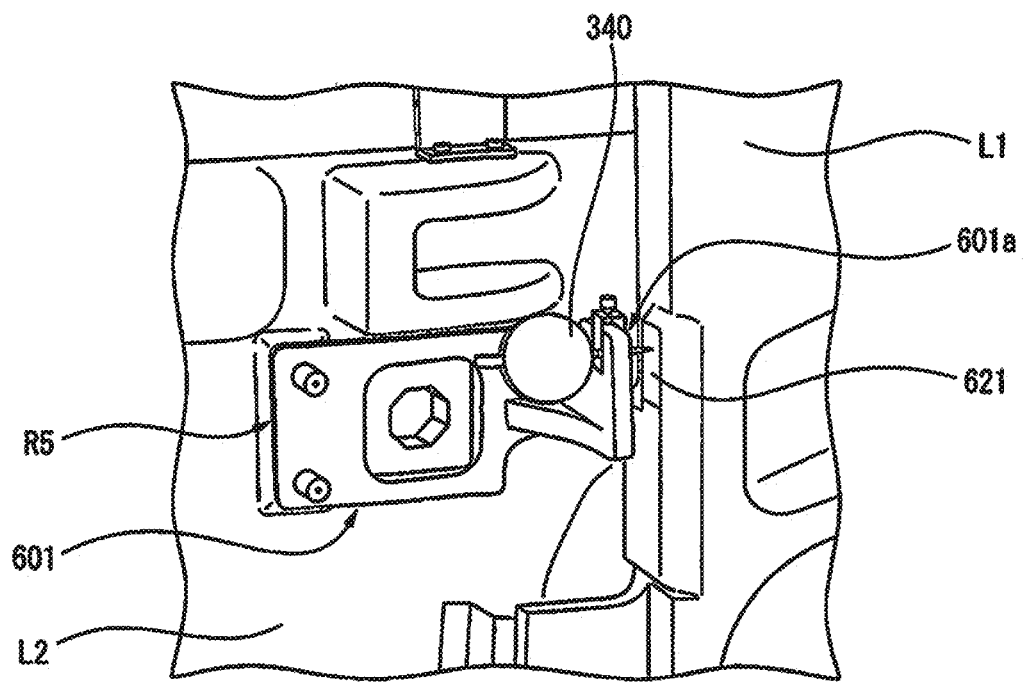
FIG. 20 is an enlarged view of the vicinity of a measurement member in FIG. 19.

Next, independent calibration of the joint axis J2 will be described with reference to FIGS. 19 to 22. FIG. 19 is a perspective view of the vicinity of the joint axis J2 of the robot 10. FIG. 20 is an enlarged view of the measurement member 601 in FIG. 19. The measurement member 601 is attached to a reference surface R5 of the link L2 (arm member) as a jig for measuring the relative positional relationship of the link L1 and the link L2. A reference surface 621 is formed on the link L1. A dial gauge 340 is attached to the gauge attachment surface 601a of the measurement member 601. The operator OP operates the teach pendant 30 to rotate the link L2 about the joint axis J2 and brings the reference surface 621 of the link L1 close to the gauge attachment surface 601a of the measurement member 601 until the readout of the dial gauge 340 falls within the predetermined range. As a result, the relative positional relationship between the reference surface 621 and the gauge attachment surface 601a is measured. When the readout of the dial gauge 340 is within the predetermined range, the position of the joint axis J2 is stored. As a result, calibration of the origin position of the joint axis J2 can be performed.

Figure 21:
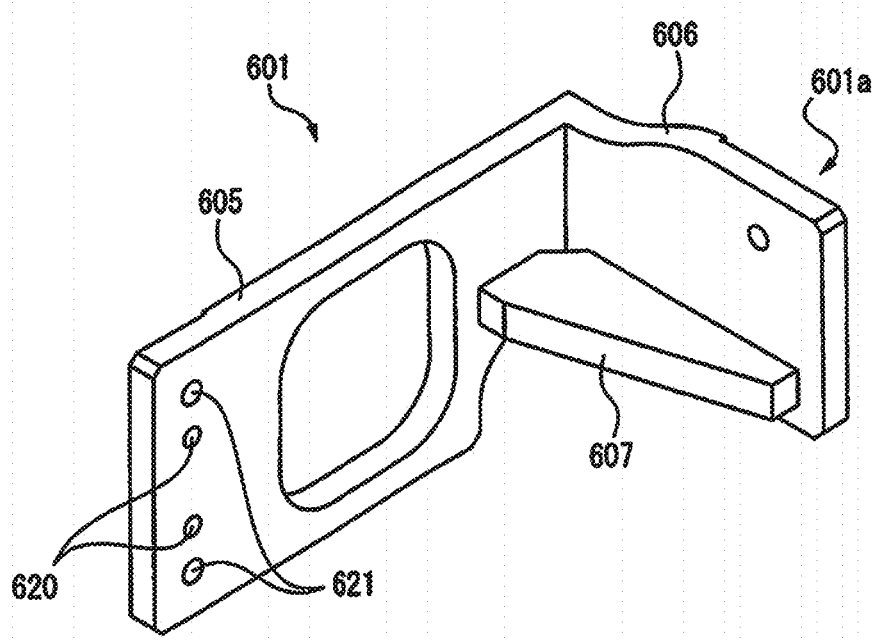
FIG. 21 is a perspective view of a measurement member.
Figure 22:
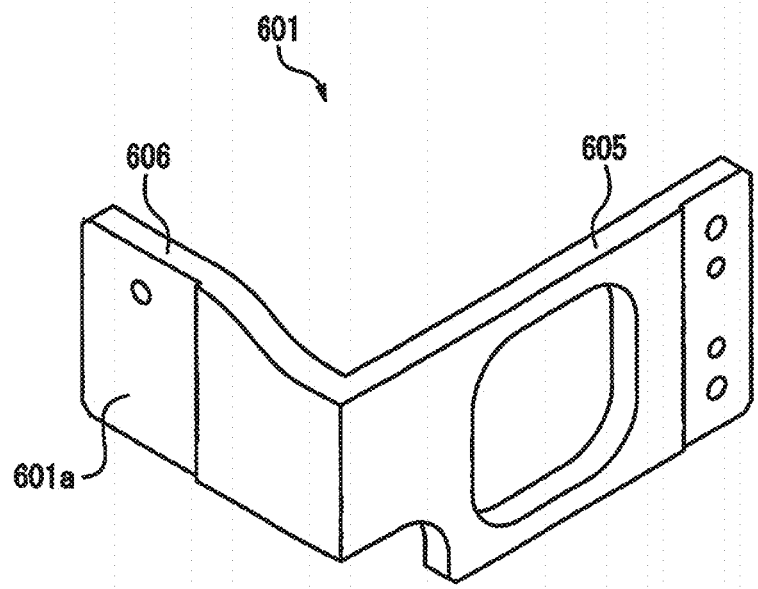
FIG. 22 is a perspective view of the measurement member as viewed from the back surface side in FIG. 21.

FIG. 21 is a perspective view of the measurement member 601 and FIG. 22 is a perspective view of the measurement member 601 as viewed from the back surface side in FIG. 21. As shown in FIGS. 21 and 22, the measurement member 601 includes a mounting wall 605 which is attached to the reference surface R5 of the link L2, a gauge mounting wall 606 which is formed so as to extend at a right angle from the mounting wall 605, and a support wall 607 which supports the gauge mounting wall 606. Threaded holes 620 and positioning pin holes 621 are formed in the mounting wall 605, and the measurement member 601 is secured with screws after having been accurately positioned on the reference surface R5 of the link L2 via the threaded holes 620 and the positioning pin holes 621. The front side surface of the gauge mounting wall 606 in FIG. 22 constitutes the gauge attachment surface 601a.

According to the present embodiment described above, collective calibration is performed for some of the joint axes including the linear motion axis among all of the joint axes of the robot, and independent calibration is individually performed for the other joint axes, even in the case of a robot having a structure including a linear motion axis and for which collective calibration of all of the joint axes is difficult. As a result, calibration can be efficiently performed while avoiding inconveniences such as an increase in the size of the calibration members.

It should be noted that though the case in which the robot 10 includes a linear motion axis has been described in the embodiments described above, there may be various examples of robot configurations (i.e., robot configurations for which collective calibration of all of the joint axes is difficult) to which the calibration method according to the present embodiment can be effectively applied other than the embodiments described above.

Figure 23:
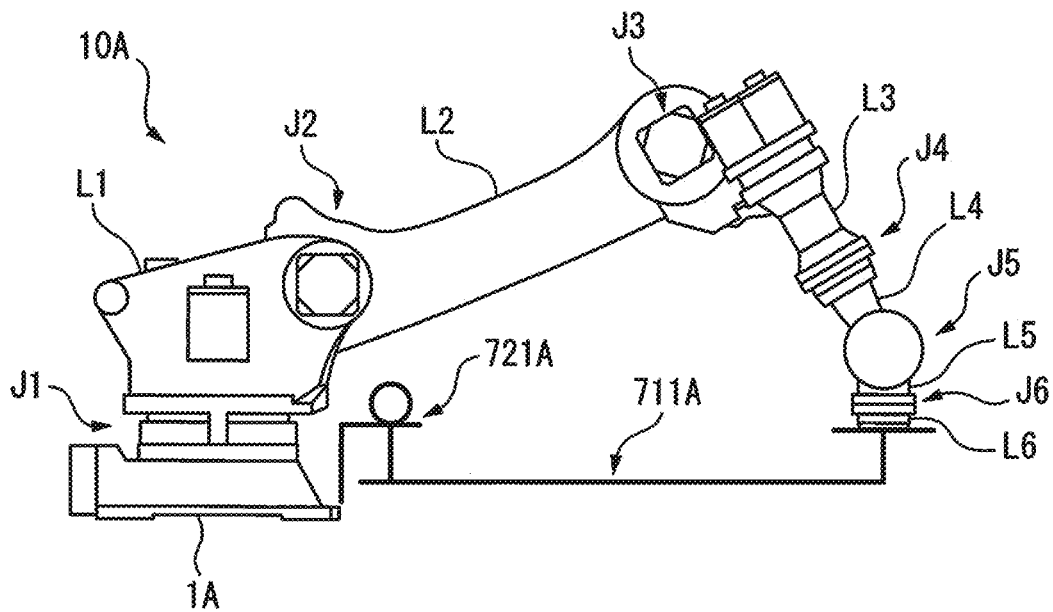
FIG. 23 illustrates another configuration example of a robot to which the calibration procedure according to the present embodiment can be suitably applied.
Figure 24:
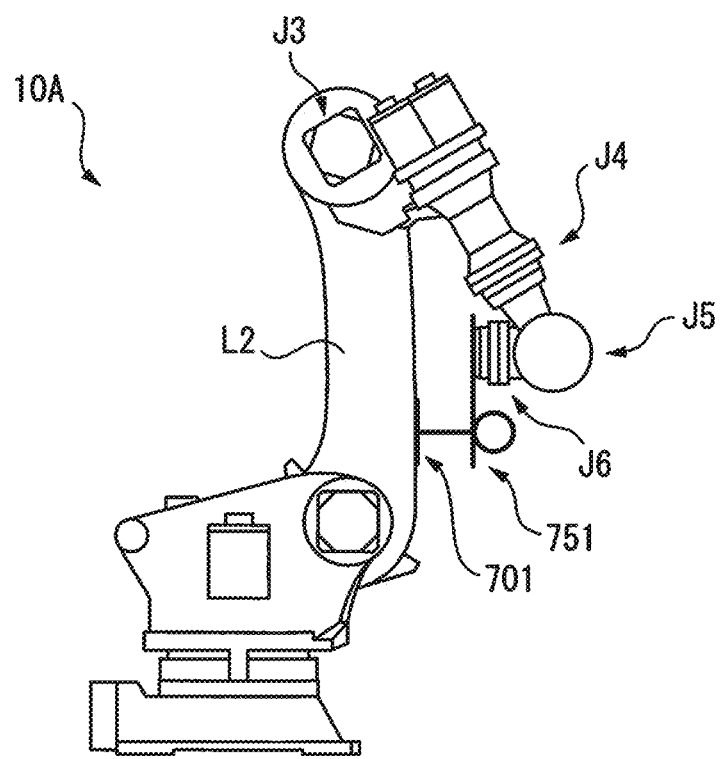
FIG. 24 is a view showing a state in which collective calibration is performed for the third through sixth joint axes.

FIG. 23 illustrates another structure of a robot to which the calibration procedure according to the present embodiment can be appropriately applied. In a robot 10A shown in FIG. 23, the second link L2 is formed to be long, and consequently, if calibration members (711A, 721A) are attached to the wrist and the base 1A, so as to perform collective calibration for all of the joint axes, a problem may occur in that the members (711A, 721A) become large. In a case such as this as well, like the structure described in the embodiment described above, a procedure is adopted in which calibration jigs 701, 751 are attached to the second link L2 and the wrist, and collective calibration for the joint axes J3 to J6 is performed (FIG. 24). Independent calibration is then individually performed for joint axes J1, J2. As a result, calibration efficiency can be increased, like in the embodiment described above.

Figure 25A:
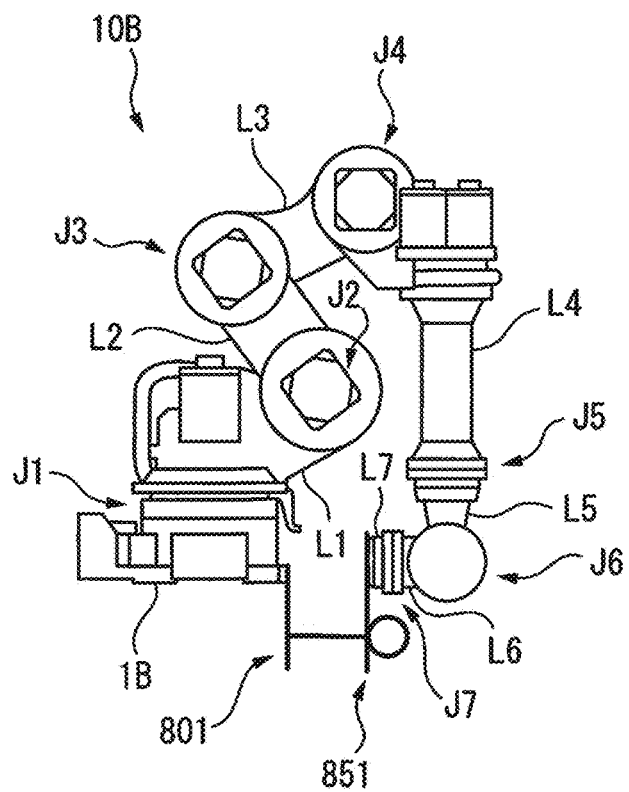
FIG. 25A illustrates yet another example of the configuration of a robot to which the calibration procedure according to the present embodiment is suitably applied.
Figure 25B:
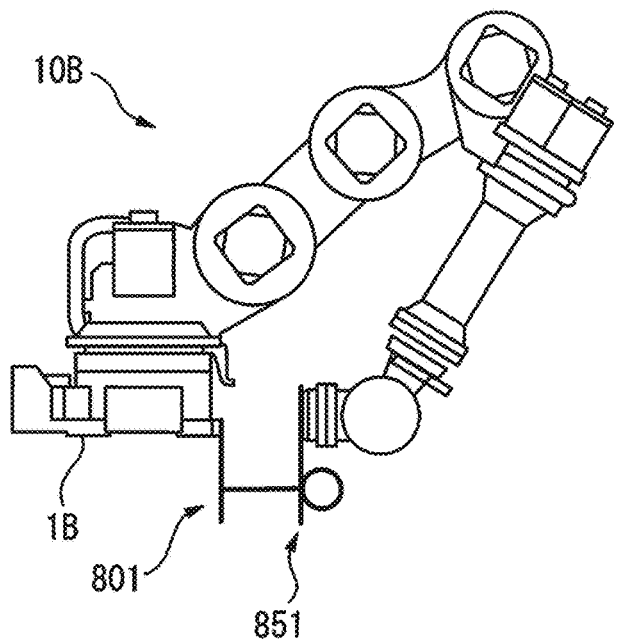
FIG. 25B illustrates yet another example of the configuration of a robot to which the calibration procedure according to the present embodiment is suitably applied.

FIGS. 25A and 25B illustrate yet another example of the configuration of a robot to which the calibration procedure according to the present embodiment is appropriately applied. The robot 10B shown in FIGS. 25A and 25B is a seven-axis robot. Thus, even if calibration members 801, 851 are attached to the base 1B and link L7 (wrist), and the link L7 (wrist) is positioned with respect to the base 1B, the posture of the robot 10B is not uniquely specified, as shown in FIGS. 25A and 25B. In this case, collective calibration of all of the joint axes cannot be performed.

Figure 26:
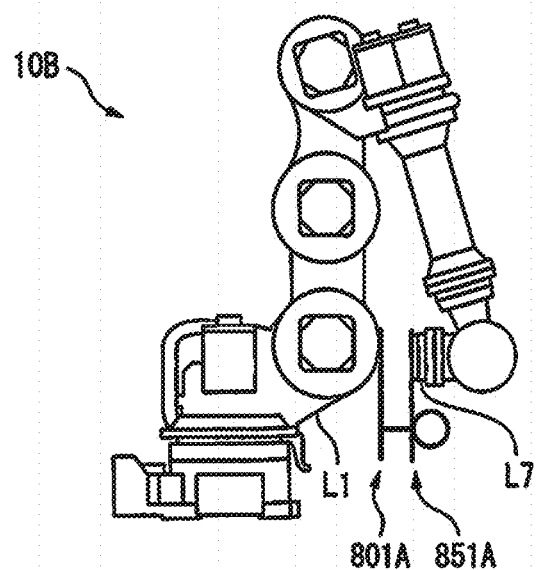
FIG. 26 is a view showing a state in which collective calibration is performed for the second through seventh joint axes.

As shown in FIG. 26, calibration members 801A and 851A are attached to the link L1 and the link L7 (wrist), respectively, and collective calibration of the six joint axes J2 to J7 is performed. Independent calibration is individually performed for the joint axis J1. As a result, the efficiency of calibration can be increased, like in the embodiment described above.

According to the present embodiments described above, even in the case in which the robot has a structure in which collective calibration of all of the joint axes is difficult, calibration of the joint axes can be efficiently performed.

Though the embodiments of the present disclosure have been described above, a person skilled in the art would understand that various changes and modifications can be made without departing from the scope disclosed in the claims, which are described below.

In the embodiments described above, collective calibration is performed for a part of all of the joint axes of the robot, and independent calibration is performed for the remaining joint axes. However, when the robot has a large number of joint axes, a procedure in which the joint axes are separated into a plurality of groups, and collective calibration is performed for each of the groups may be adopted.

In the embodiments described above, when calibration is performed collectively or independently, though a measuring instrument is configured with jigs to measure the relative positional relationship between two links, a vision system in which a visual mark is imaged with a camera may be used as the measuring instrument for measuring the relative positional relationship between two links.

The invention claimed is:

1. A robot calibration method in which a position of an arm tip of an articulated robot comprising an arm having a plurality of links and a plurality of joint axes and a base which supports the arm via another joint axis is calibrated, the method comprising:
measuring a relative positional relationship between a first link and a second link on opposite ends of at least three links which are separated from the base and which are connected to each other so as to execute collective calibration for at least two joint axes between the at least three links;
measuring a relative positional relationship between the base and a link connected to the base to execute independent calibration for a joint axis between the base and the link, or measuring a relative positional relationship between the first link and another link connected to the at least three links so as to execute independent calibration for a joint axis between the first link and the other link; and calibrating the position of the arm tip based on the collective calibration and the independent calibration.

2. The robot calibration method according to claim 1, wherein the at least two joint axes for which the collective calibration is executed include a linear motion axis.

3. The robot calibration method according to claim 1, wherein the collective calibration is executed by contact-measuring, with a gauge, relative positions and relative postures between a first reference surface defined on the first link and a second reference surface defined on the second link.

4. A robot calibration device which calibrates a position of an arm tip of an articulated robot comprising an arm having a plurality of links and a plurality of joint axes and a base which supports the arm via another joint axis, the device comprising:

a first reference surface and a second reference surface which are provided on a first link and a second link, respectively, on opposite ends of at least three links which are separated from the base and which are connected to each other;

a gauge which contact-measures relative positions and relative postures between the first reference surface and the second reference surface;

a measuring instrument which measures a relative positional relationship between the base and a link connected to the base, or a measuring instrument which measures a relative positional relationship between the first link and another link connected to the at least three links; and a processor which calibrates the position of the arm tip based on measurement results of the gauge and measurement results of the measuring instrument.

5. The robot calibration device according to claim 4, wherein at least two joint axes between the at least three links include a linear motion axis.

6. The robot calibration device according to claim 4, further comprising a first member attached to the first reference surface and a second member attached to the second reference surface, wherein the gauge is attached to the first member and measures a position and posture of the second member relative to the first member.

7. The robot calibration device according to claim 6, wherein the first member includes a pair of gauge attachment surfaces which are orthogonal to each other, and the second member includes a pair of gauge measurement surfaces which are orthogonal to each other and which respectively face the pair of gauge attachment surfaces.

* * * * *